April 14, 1931.  N. R. CAMPBELL  1,800,337
GAS FILLED PHOTOELECTRIC CELL
Filed Feb. 10, 1928   2 Sheets-Sheet 2

Inventor,
Norman R. Campbell
M. T. Lockwood
Attorney.

Patented Apr. 14, 1931

1,800,337

UNITED STATES PATENT OFFICE

NORMAN ROBERT CAMPBELL, OF WATFORD, ENGLAND

GAS-FILLED PHOTO-ELECTRIC CELL

Application filed February 10, 1928, Serial No. 253,280, and in Great Britain February 25, 1927.

This invention relates to improvements in methods of using gasfilled photoelectric cells. For certain purposes, for example picture radio telegraphy, it is desirable to produce a current varying with relatively high frequency, say 5000 cycles per second, by the action of light, varying with a considerably lower frequency. This purpose may be achieved by utilizing the oscillatory current given by a photoelectric cell working on a normally unstable portion of its characteristic in series with a stabilizer. The frequency of the oscillations depends on the current limited by the stabilizer, the capacity and the illumination of the cell.

Figure 1:
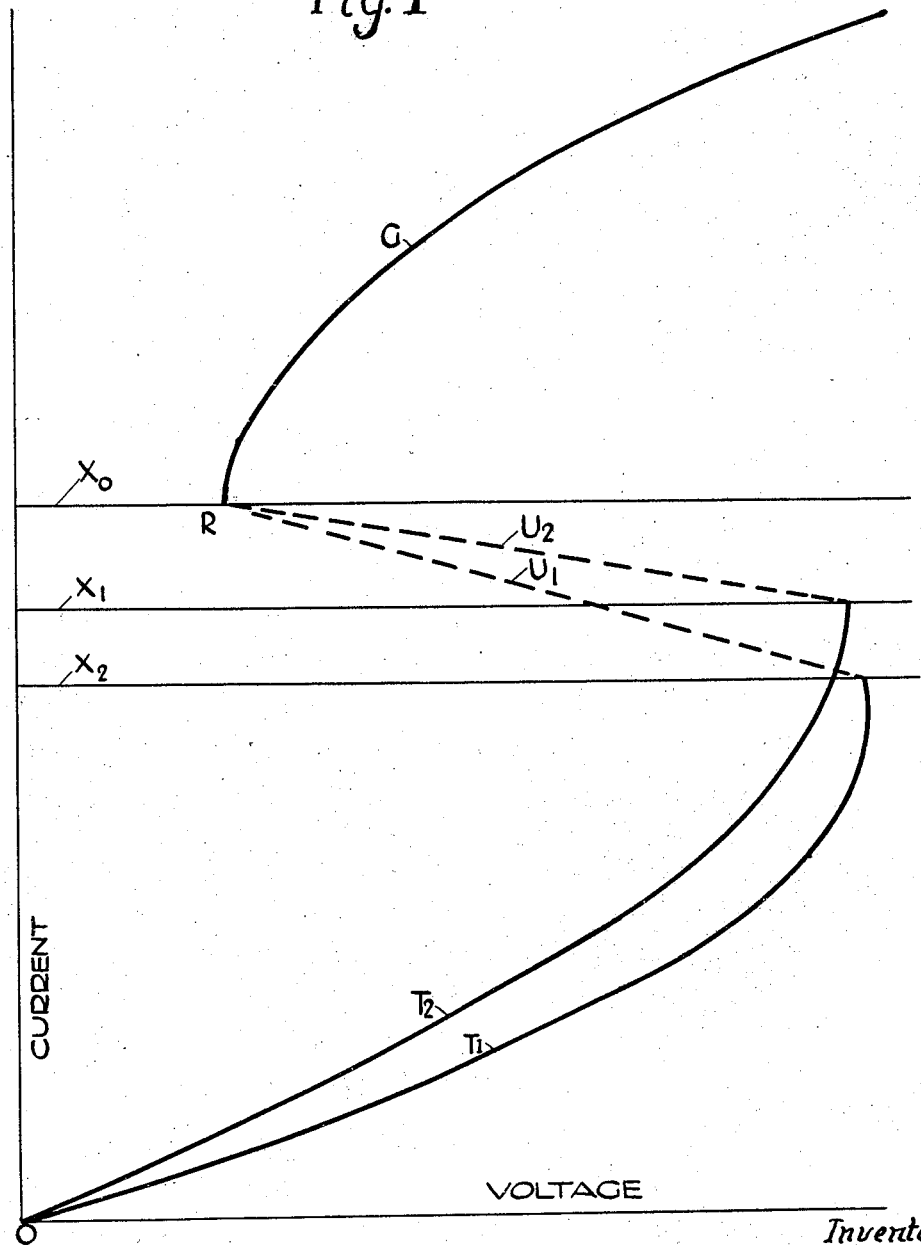
Figure 2:
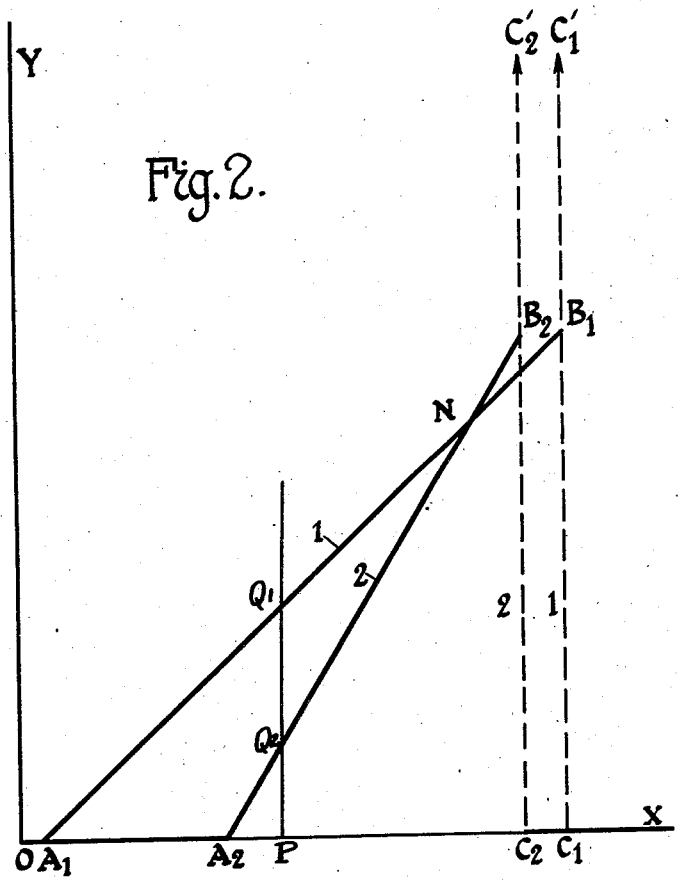
Figure 3:
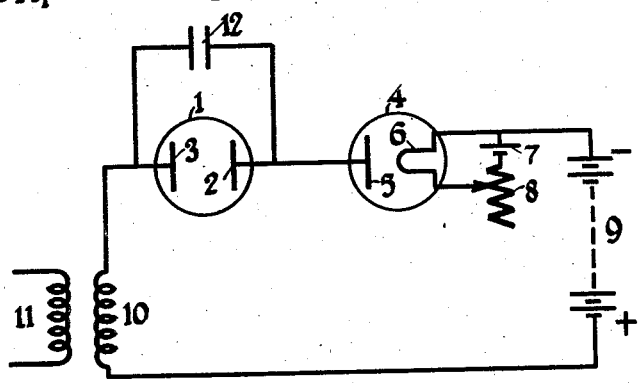

In the accompanying drawings Figure 1 is a curve of the unstable characteristics plotted voltage against current; Figure 2 shows characteristics diagrammatically plotted frequencies against current and Figure 3 shows a suitable circuit arrangement for applying the invention.

First the meaning of the term "unstable characteristic" must be explained. It is known that the current through an illuminated gasfilled cell increases regularly with the potential difference between the electrodes, so long as this potential difference does not exceed a certain maximum, called the sparking potential. When the sparking potential is reached, a sudden increase of current occurs and a glow develops in the cell; when the glow has been started the current will again vary regularly with the potential difference, but in a different manner. A cell has therefore two potential characteristics each defining a relation between current and potential, one refers to the state in which there is no glow discharge and is known as the Townsend characteristic, the other refers to the state in which there is a glow discharge and is known as the glow characteristic. Both these characteristics are stable, the current increases with the potential. The Townsend characteristic depends on the illumination of the cell; the glow characteristic is almost independent of it.

These two potential characteristics are shown in Figure 1 of the accompanying drawings. The figure does not represent accurately the characteristics for any particular cell, but illustrates only those features of the characteristics, common to all cells, to which attention is about to be drawn. The two curves $T_1$, $T_2$ represent the Townsend characteristics of the cell for a less and a greater illumination respectively; G represents the glow characteristic, which is almost independent of the illumination.

It will be seen that the currents on the glow characteristic G are all greater than any of the Townsend characteristic; there is an intermediate range of current (namely that between the line $X_0$ and the line $X_1$ or $X_2$, according as the cell receives the less or the greater illumination) which does not belong to either of these. A continuous current within this range cannot be made to flow through the cell.

But if the circuit external to the cell contains a current limiter, a current of which the mean value lies in this range can be made to pass through the cell. Thus there may be placed in series with the cell a thermionic diode and a source of potential greater than the sum of the sparking potential of the cell and the potential required to saturate the thermionic current, the temperature of the cathode of the diode being such that the saturated current through it lies within this range. For then, since the potential across the cell can never rise above the sparking potential, the potential across the diode will always be at least as great as the saturation potential, and the saturated current will flow continuously through the diode.

However this current will not flow continuously through the cell. The conditions will be similar to those well known in the "flashing" neon lamp. The current through the diode will charge up the condenser formed by the electrodes of the cell (together with any condenser placed in parallel with them) until the sparking potential of the cell is reached. A glow discharge will then pass through the cell, carrying a current greater than that which flows through the diode. The condenser will therefore discharge until the potential indicated by the point R in Figure 1 is reached, and the glow discharge can be no longer maintained. The current through the cell will then cease and the condenser begin to charge up once more.

Exactly the same conditions will obtain if a sufficiently high ohmic resistance is used as a current limiter in place of the thermionic diode. Its resistance must be so great that the potential drop across it is always large compared with that across the cell, so that the current flowing through it is practically independent of the discharge in the cell. But the ohmic resistance is less convenient, because a very high potential has to be used in series with it, namely one that is large compared with the sparking potential of the cell.

Accordingly when a current limiter of this kind is placed in circuit and adjusted so that the value of the current determined by it lies between $X_0$ and $X_1$ (or $X_2$), a mean current of this value will pass around the circuit, but the current through the cell will be intermittent and consist of a series of discharges similar to the glow discharge separated by intervals in which little current flows. Corresponding to the mean value of the current there will be a mean value of the potential across the tube; the relation between this mean current and mean potential will define another characteristic, joining the Townsend characteristic to the glow characteristic; since the mean voltage decreases as the mean current increases, this intermediate characteristic may be called the unstable characteristic. This unstable characteristic is shown in Figure 1 by the lines $U_1$, $U_2$, corresponding to the lesser and greater illuminations; really its form is much more complicated than that shown, but its slope is always opposite in sign to that of the glow and Townsend characteristics.

The methods for using photoelectric cells known hitherto, depend upon the fact that the relation between potential and current varies with illumination in the range of the Townsend characteristic, and they can be described simply in terms of the variations of that characteristic with light. The unstable characteristic also varies with light and can therefore be used, like the Townsend characteristic, for the detection and measurement of light; method of using it have actually been proposed. But in the range of the unstable characteristic, it is possible to use for the same purpose the frequency characteristic, that is to say, the relation between the mean current through the circuit and the frequency of the intermittence of the current through the cell; for this frequency characteristic also varies with the illumination. The present invention, in its widest aspects, consists of a method of using a gas-filled photoelectric cell for the detection or measurement of light or the control of currents by light which depends on the change produced by light in the unstable portion of the frequency characteristic of the cell.

Methods according to the present invention suitable in various circumstances can be devised by a study of the unstable portion of the frequency-current characteristic of a photoelectric cell. Figure 2 of the accompanying drawings shows examples of the characteristic diagrammatically, frequencies being measured along OY and currents along OX. It must be understood that the curves shown are not those of any particular photoelectric cell; they are not drawn to scale and do not represent details; they illustrate merely those broad features common to all cells, or at least to all cells of a very general type, that are important for the purposes of the invention.

Curves 1 and 2 refer respectively to a smaller and a greater illumination. Each of them starts at small currents with a portion $OA_1$ or $OA_2$ where the frequency is zero; this portion corresponds to the stable Townsend characteristic. Next there is a portion $A_1 B_1$ or $A_2 B_2$ along which the frequency is finite and increases with the current. This is the unstable portion of the characteristic, which can be realized only if there is a current limiting device in series with the cell and if the potential applied across the cell and limiter is greater than the sparking potential. The frequency depends, of course, upon the capacity of the circuit, and not only on the current and the illumination; but the capacity is assumed to be constant. At $B_1$ or $B_2$ the stable glow discharge starts and the frequency falls to zero at $C_1$ or $C_2$, and remains zero when the current is increased further. Experimentally, however, zero frequency is indistinguishable from infinite frequency, and the change at $B_1$ or $B_2$ can be described also as a sudden increase of the frequency to infinity in the direction $C'_1$ or $C'_2$. This second method of description is the more convenient for my purpose, and possibly more in accordance with the physical processes involved. I shall therefore regard the course of the characteristic as $OA_1 B_1 C'_1$, (where $C'_1$ is at infinity,) and not $OA_1 B_1 C_1$.

The portion $A_1 B_1$ or $A_2 B_2$, alone relevant to this invention, falls into 3 ranges. There is the low frequency range, from $A_1$ or $A_2$ to N, over which illumination produces a decrease of frequency; here oscillations occurring when the frequency is low can be stopped by increasing the illumination. In the neighbourhood of N the frequency is almost independent of the illumination. Over the high frequency range between N and $B_1$ or $B_2$, the frequency increases with the illumination; but again, since increase of the frequency to infinity means a stoppage of the oscillations, the oscillations at low illuminations can be stopped by increasing the illumination. According to the invention either the high frequency or the low frequency range can be used for the detection of light.

These features are believed to be common to all gas-filled photoelectric cells of existing types. But there are certain differences between the two main existing types that require attention. In one type, which will be called the spherical type, the anode is very small compared with the cathode, which usually consists of the inner wall of the vessel. In the other type, which will be called the plane type, the areas of cathode and anode are not very different, the anode is often a gauze, and for the purpose of this statement the area of the gauze is taken to be the area of the plane surface having the same circumference as the gauze.

In the spherical cell changes of the frequency with small changes of the current are not always reversible in the neighbourhood of $B_1$ or $B_2$; the characteristic here is variable and not definite. In the plane cell, the characteristic in the neighbourhood of $A_1$ or $A_2$ is similarly indefinite. The spherical cell is therefore better suited for work on the low frequency range, the plane cell for work on the high frequency range.

The choice of the range and of the appropriate type of photoelectric cell will depend upon the object to be attained. If the object is to stop, by means of light, oscillations with a frequency of the order of 5000 per second, then the higher frequency range must be used, preferably with a plane cell, because only in this range can a frequency of intermittence of the current be obtained. But the light required to stop the oscillations will be relatively great; thus, if the cathode consists of potassium sensitized by the discharge in hydrogen and if the aperture through which light enters the cell has an area of 5 sq. cms. the light from a 60 watt gas-filled incandescent lamp at the distance of 1 metre may be required.

If on the other hand the object is to detect very feeble illumination then the low frequency range should be used; for, as might be expected, the method is in general the more sensitive the smaller is the current passing through the cell. The current may then be adjusted so that the frequency is of the order of 1 per second, and light from the 60 watt lamp at a distance of several hundred meters may be detected by the change in this frequency. Alternatively, but less sensitively, the current may be adjusted so that the cell is at the point $A_1$ of its characteristic and any increase in current sets up an intermittency or oscillation of the current. The incidence of illumination may then be detected by the increase in current which is necessary to restore the cell to the state in which any increase of current again causes intermittency.

A circuit arrangement suitable for applying the invention is shown in Figure 3. Here 1 is the gas-filled photoelectric cell with the cathode 2 and the anode 3; connected with the thermionic current limiter 4 having an anode 5 and filament 6; the filament is heated by a battery 7 in series with an adjustable rheostat 8 by means of which the current flowing through the current limiter can be varied. To the current limiter 4 a battery 9 is connected giving a potential greater than the sparking potential of the photoelectric cell. This battery is also connected to one winding 10 of a transformer, the other winding 11 of which includes the means for detecting or utilizing the oscillating current. If the apparatus is to be used merely for detecting or measuring light the winding 11 may be connected to a telephone with or without intermediate amplification means. If it is to be used for controlling electrical signals the winding 11 will be connected to the signalling device.

At 12 is shown a condenser connected across the photoelectric cell. Its presence is not always necessary, but it is sometimes useful for adjusting the frequency of the oscillations. It is particularly useful when the lower frequency range is being used to detect very small illuminations. When the cell is very near the point $A_1$ or $A_2$ on its characteristic it will sometimes be found that a small condenser 12, with a capacity of the order of 100 micro-microfarads will improve the stability of the oscillations and increase the sensitiveness of the device. In certain circumstances in this region the frequency may be a maximum for a particular capacity; the method will then be most sensitive when this capacity is used.

As has previously been described, when an intermittent current is flowing through the cell, the effect of a change in the intensity of illumination of the cell is to produce a change in the frequency of the intermittence. An example will serve to make this clear. Suppose that the current through the filament 6 of the current limiter 4 has been so adjusted that an intermittent current is flowing through the oscillatory circuit comprising the battery 9, the current limiter 4, the cell 1 and the transformer winding 10, the mean value of the intermittent current being represented on Figure 2 by an abscissa OP slightly greater than that of $A_2$; and the intensity of illumination being that corresponding to curve 1. The ordinate through the point P will intersect curve 1 at $Q_1$ and the frequency of the intermission will correspond to the value of the ordinate at the point of intersection. If now the intensity of illumination be changed to that corresponding to curve 2, it will be seen that the frequency of intermission will be reduced to that corresponding to $Q_2$. If the current initially flowing through the cell 1 be sufficiently small, the change to the more intense illumination reduces the frequency of intermission of the current flowing to the oscillatory circuit aforesaid to zero.

What I claim is:—

1. Means for controlling electrical currents of relatively high frequency by means of light varying with relatively low frequency which comprises an electrical circuit arrangement including in series a gas-filled photoelectric cell, a current limiter substantially as described, and a source of potential greater than the sparking potential of the cell, the amount of current which it allows to flow through the said cell being such that the said cell will operate on some part of the unstable frequency-current characteristic.

2. An electrical circuit arrangement comprising in series a gas-filled photoelectric cell, a current limiter substantially as described, a source of potential greater than the sparking potential of the cell and means capable of utilizing changes in the frequency of the current, the current through the cell controlled by the current limiter being such that an intermittent current flows through the cell and the frequency of the said current varies with the illumination falling upon the cell.

3. An electric circuit arrangement for detecting light comprising a gas-filled photoelectric cell, a current limiter substantially as described, a source of potential greater than the sparking potential of the cell and means capable of detecting changes in the frequency of the current, connected in series, the current through the cell being so controlled by the current limiter that an intermittent current flows through the cell and the frequency of said current varies with the illumination falling upon the cell.

NORMAN ROBERT CAMPBELL.